(12) United States Patent
Ferenc et al.

(10) Patent No.: US 9,321,380 B2
(45) Date of Patent: Apr. 26, 2016

(54) VEHICLE SEAT WITH ARRESTER ELEMENT

(71) Applicant: Brose Fahrzeugteile GmbH & Co. Kommanditgesellschaft, Coburg (DE)

(72) Inventors: Anthony Ferenc, Goodrich, MI (US); Anil Bhat, Farmington Hills, MI (US); Tracy Cui, Shelby Township, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 14/451,142

(22) Filed: Aug. 4, 2014

(65) Prior Publication Data

US 2015/0035327 A1 Feb. 5, 2015

Related U.S. Application Data

(60) Provisional application No. 61/862,375, filed on Aug. 5, 2013.

(51) Int. Cl.
*B60N 2/427* (2006.01)
*B60N 2/42* (2006.01)
*B60N 2/16* (2006.01)

(52) U.S. Cl.
CPC .......... *B60N 2/42709* (2013.01); *B60N 2/1615* (2013.01); *B60N 2/4235* (2013.01); *B60N 2/43* (2013.01)

(58) Field of Classification Search
CPC ............... B60N 2/4221; B60N 2/4228; B60N 2/42709; B60N 2/4235; B60N 2/1615; B60N 2/43; B60N 2/42736
USPC ................ 297/216.19, 216.2, 216.16, 344.15
See application file for complete search history.

(56) References Cited

U.S. PATENT DOCUMENTS 8,353,558 B2 * 1/2013 Okamoto et al. .......... 297/216.1
8,985,686 B2 * 3/2015 Breitfeld et al. ......... 297/216.16

FOREIGN PATENT DOCUMENTS

| DE | 44 08 219 A1 | 9/1995 |
| DE | 10 2007 039 862 A1 | 2/2009 |
| DE | 20 2007 017 350 U1 | 5/2009 |
| DE | 10 2010 044 055 A1 | 5/2012 |
| DE | 10 2011 109 640 A1 | 2/2013 |

OTHER PUBLICATIONS

English translation of German Office action dated Jun. 26, 2014 for application No. DE 10 2013 221 542.8, 2 pages.

* cited by examiner

*Primary Examiner* — Milton Nelson, Jr.
(74) *Attorney, Agent, or Firm* — Lewis Roca Rothgerber Christie LLP

(57) ABSTRACT

The present invention relates to a vehicle seat with a floor component group and a seat frame which is fixed to the floor component group. The seat frame is connected to the floor component group via at least one coupling element and is arranged spaced apart from the floor component group essentially vertically to a longitudinal seat direction, wherein the coupling element is fixed to the seat frame on the one hand and to the floor component group on the other hand, and an arrester element is provided at the seat frame, which arrester element is formed and arranged in such a manner that the coupling element can make contact with the arrester element in case of a crash, and the arrester element then counteracts a deformation of the coupling element transversely to the longitudinal seat direction. The arrester element has a planar section that the coupling element can contact in case of a crash and along which forces from the coupling element are then transferred to the seat frame, in order to counteract a deformation of the coupling element transversely to the longitudinal seat direction.

9 Claims, 9 Drawing Sheets

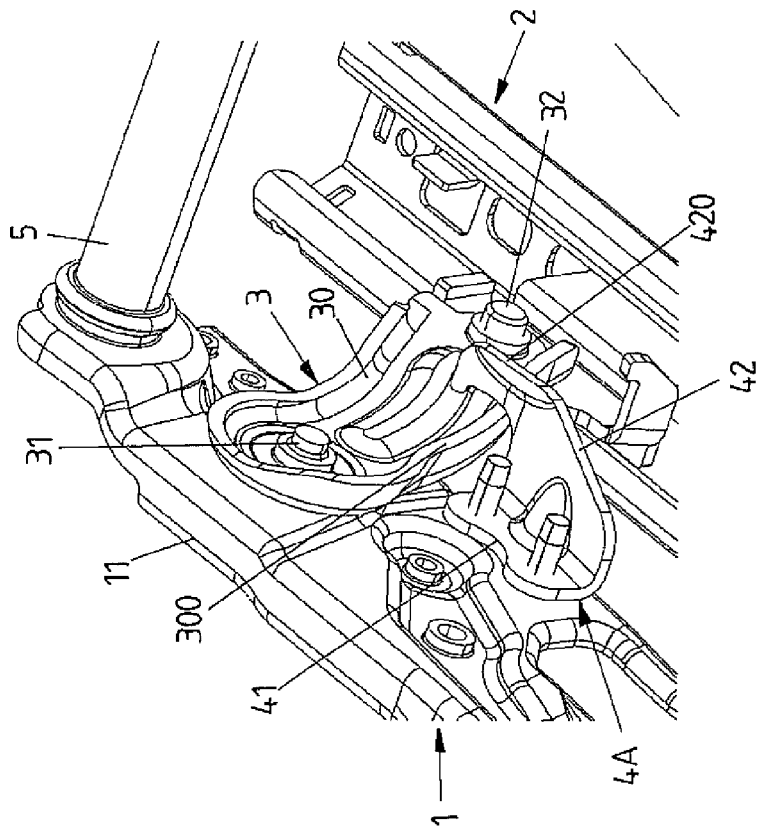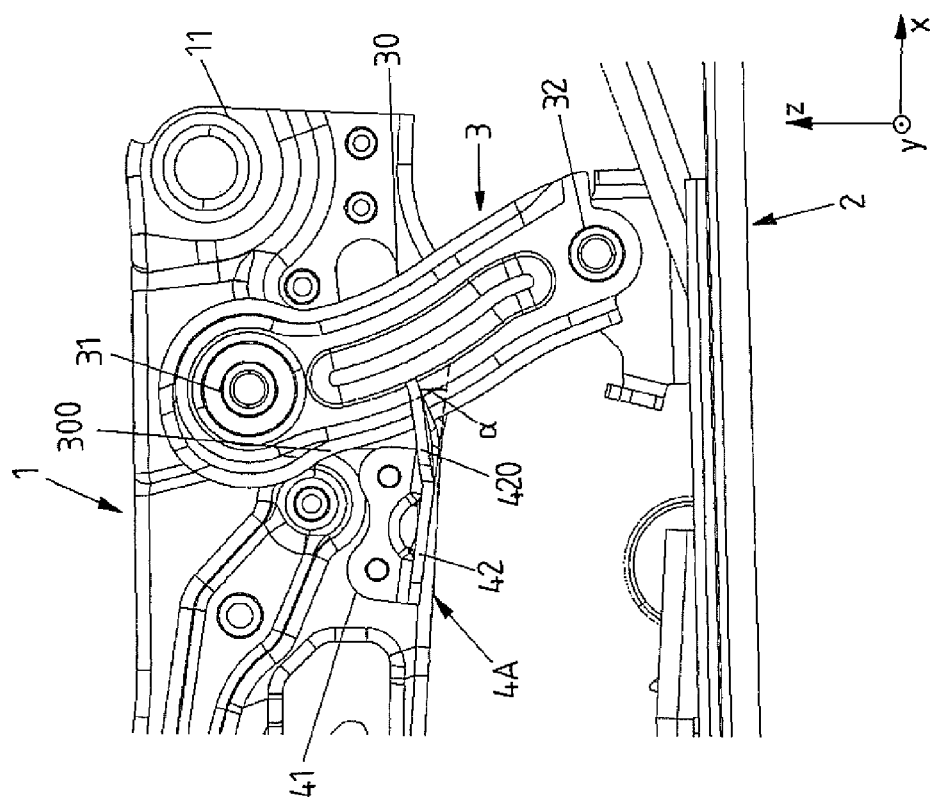

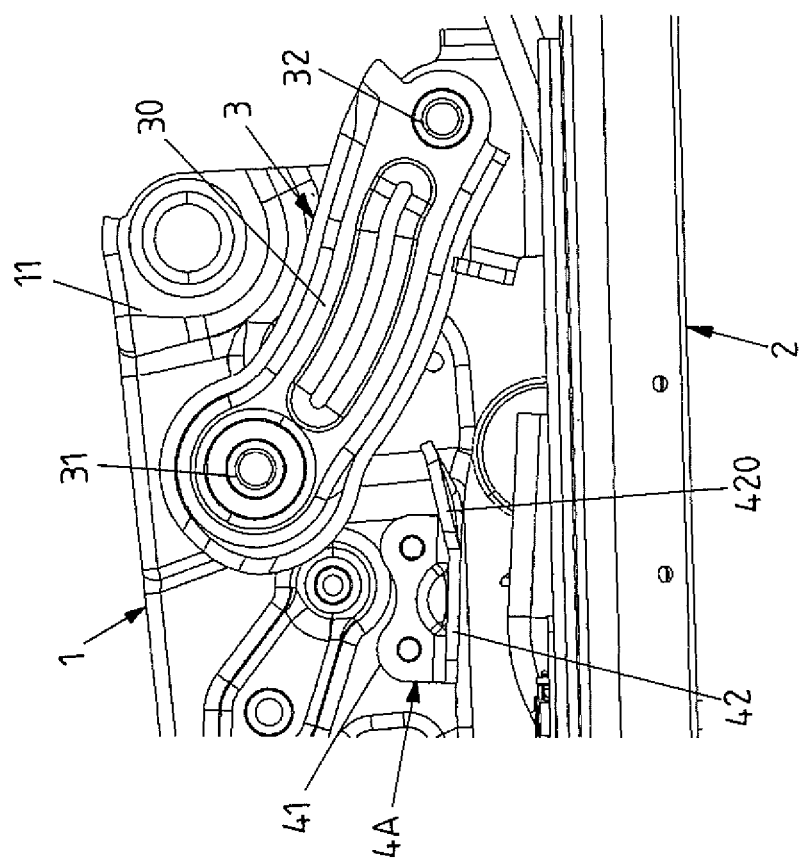

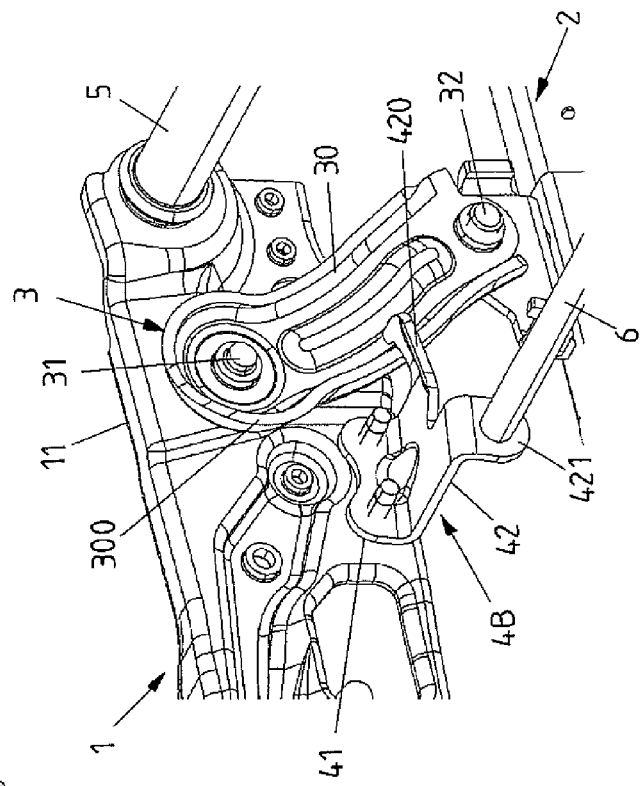
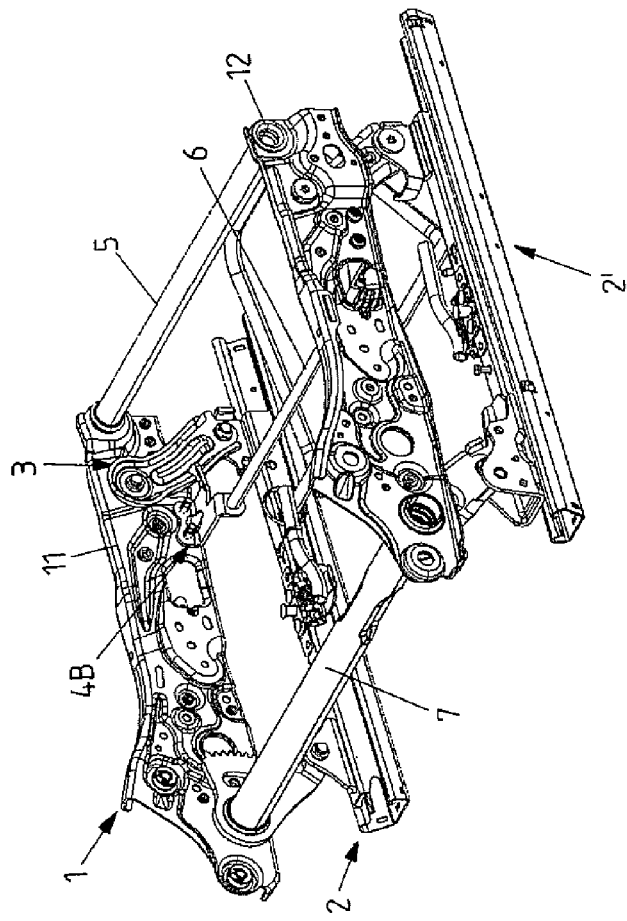

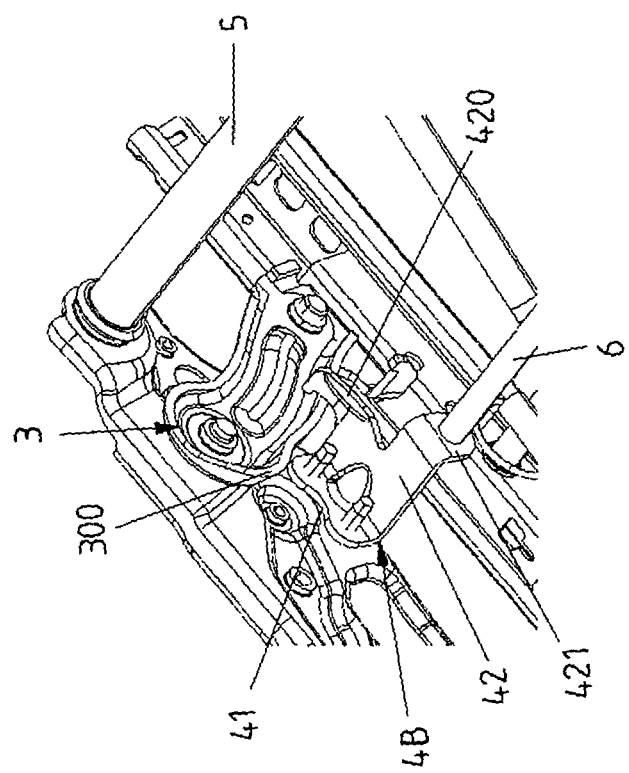

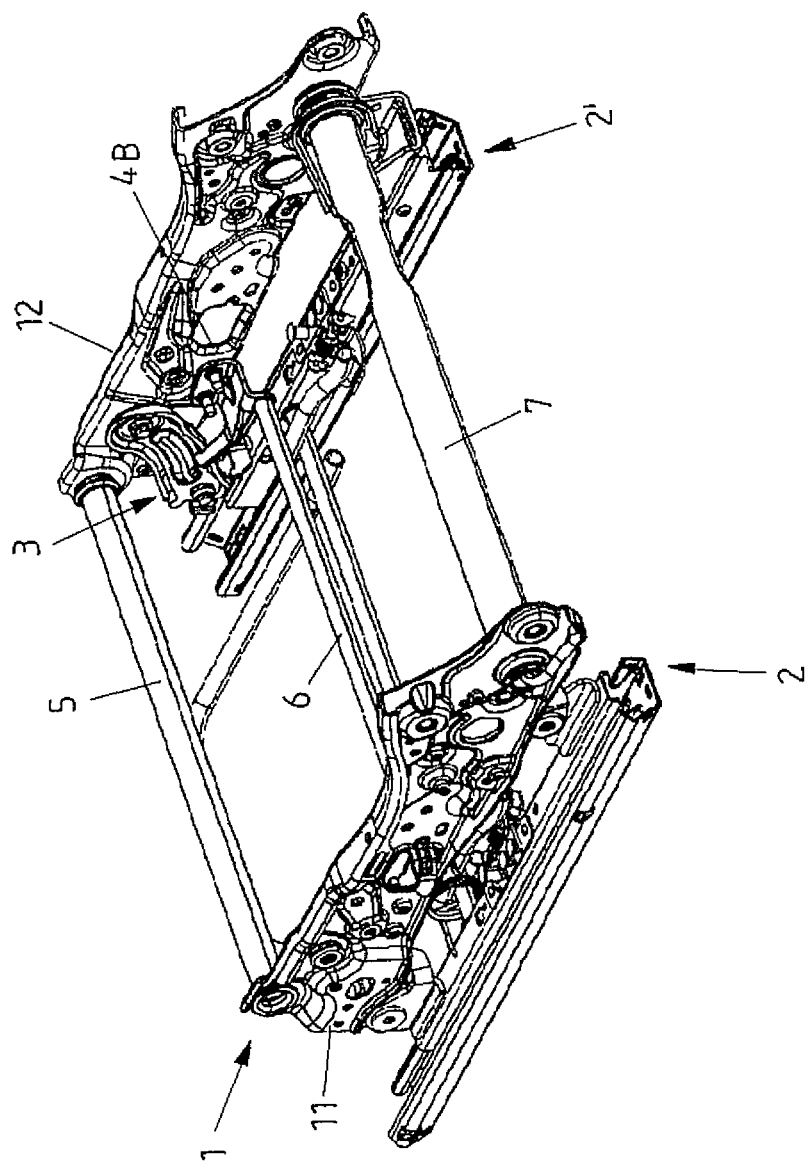

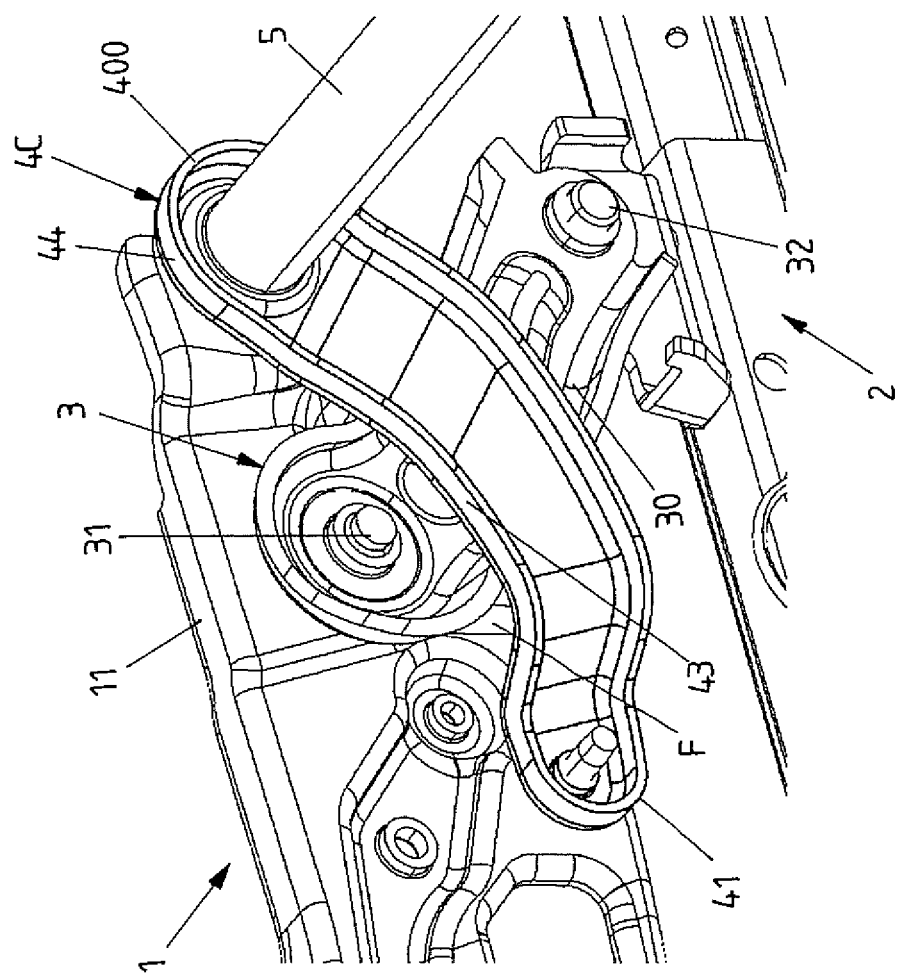

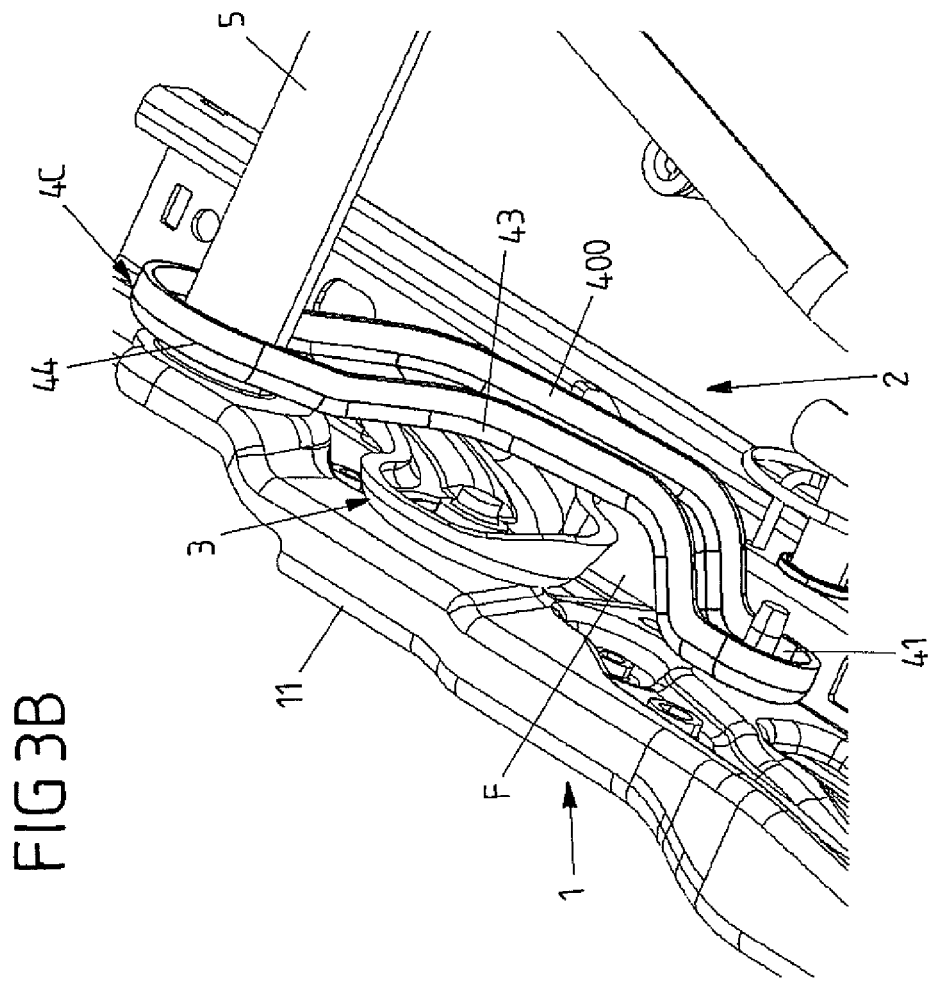

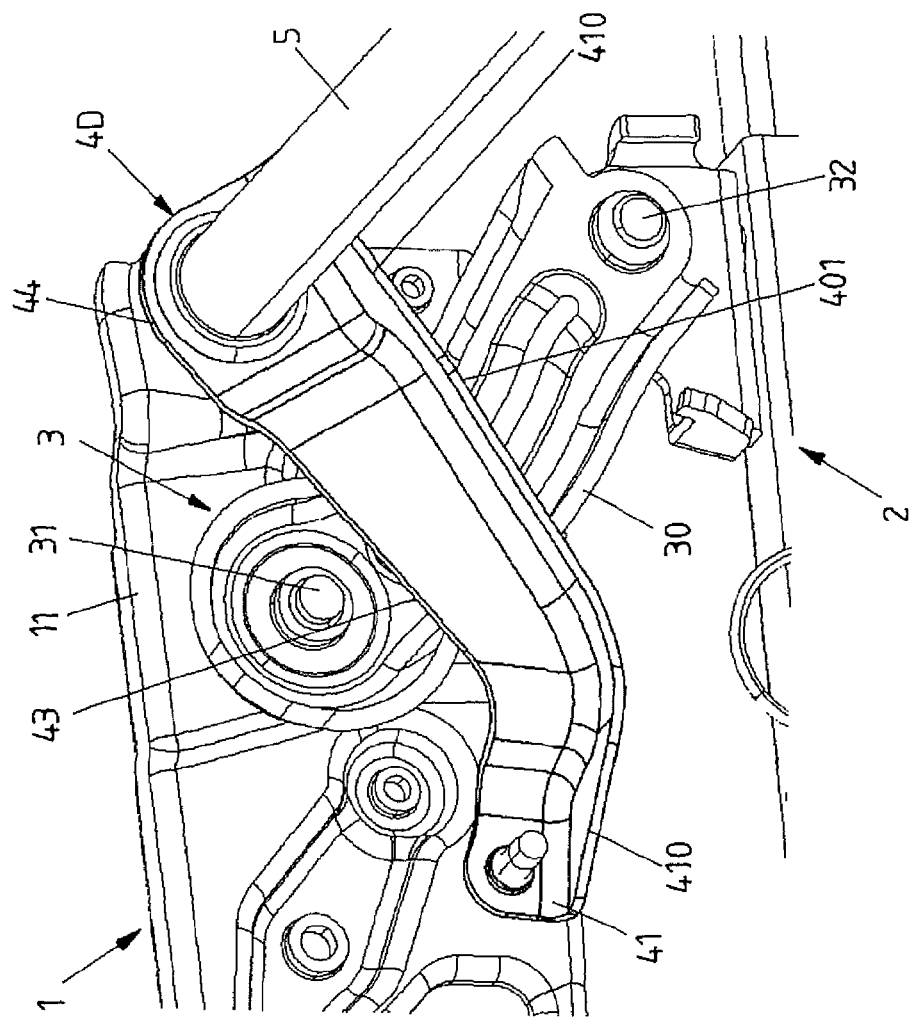

VEHICLE SEAT WITH ARRESTER ELEMENT

CROSS-REFERENCE TO RELATED APPLICATION

This application claims the benefit of U.S. Provisional Patent Application No. 61/862,375, filed on Aug. 5, 2013, the entire content of which is incorporated herein by reference.

BACKGROUND

The present invention relates to a vehicle seat.

A generic vehicle seat thereby comprises a floor component group, e.g. with a rail arrangement for the longitudinal rail guide, and a seat frame, which is fixed to the floor component group. The seat frame is connected to the floor component group via at least one coupling element and is arranged spaced apart from the floor component group essentially vertically to a longitudinal seat direction. The seat frame thereby usually carries a seat cushion and can be connected to a backrest of the vehicle seat. The coupling element is fixed, on the one hand, to the seat frame, for example at one of two seat side components opposite each other transversely to the longitudinal seat direction, and, on the other hand, to the floor component group, for example to an upper rail of a longitudinal rail guide. Accordingly, the coupling element can be a rigid component which holds the seat frame at a fixed distance to the floor component group, as is often the case, for example, with rear vehicle seats for minivans. A coupling element, however, can also be a component which is hinged to the seat frame and to the floor component group respectively in order to be able to adjust a distance of the seat frame to the floor component group in a variable manner. Such a component is then often designed as a type of lever, which is hinged to the seat frame at one end and to the floor component group at its other end.

With such coupling elements of a vehicle seat, particularly with coupling elements mounted in a hinged manner for the height adjustment of the seat frame, there is the problem in case of a crash, that is, during a collision of the vehicle with an obstacle or another vehicle, that the coupling element can deform transversely to the longitudinal seat direction, and that the seat frame thereby dislocates in a crash in an undesired manner relative to the floor component group and/or increased forces are introduced into the floor component group. Here, a deformation of the coupling element transversely to the longitudinal seat direction is understood, in particular, to be a lateral bending and a torsion of the coupling element.

For example, crash tests were carried out on a vehicle seat arranged on a rail assembly with two longitudinally displaceable rail pairs via several mounted coupling hinge elements so as to be height-adjustable, and to which a belt for a vehicle occupant seated on the vehicle seat is anchored in a fixed position on the floor of the vehicle. By means of the rigid fastening of the belt on one side to the seat frame and on the other side to the vehicle floor, large transverse forces can be present at the coupling elements, which are in the front region of the seat, viewed in the longitudinal direction of the seat. Due to this transverse force, the coupling elements can bend laterally or can be twisted. As a result of this, the seat frame can distort relative to the rail arrangement and/or higher forces can be introduced into one of the rail pairs, so that the risk for material failure increases here in case of a crash.

It is already known in practice to provide at least one arrester element on the seat frame in order to minimize this risk and to ensure that such a coupling element of the connection between the seat frame and the floor component group does not deform in an undesirable manner in a crash. Such an arrester element is formed and arranged in such a manner that the coupling element can make contact with the arrester element in case of a crash and that the arrester element then counteracts a deformation of the coupling element transversely to the longitudinal seat direction. The arrester element can thus additionally stabilize the coupling element in a crash, so that regularly this is not bent laterally or twisted.

For example, it is known in practice to form an arrester element by a pin or bolt projecting laterally from the seat frame, which pin or bolt has a head at its free end, with which a coupling element can make contact in case of a crash and via which the transversely occuring forces, which would lead to a lateral bending or a torsion of the coupling element, are introduced into the pin or bolt.

But arrester elements on vehicle seats known to date, which are intended to counteract a deformation of a coupling element, often are not sufficiently rigid transversely to the longitudinal seat direction, so that, even where there is a large distance between the seat frame and the floor component group, e.g. when the seat frame is in an upper adjustment position, sufficient resistance against a deformation of the coupling element transversely to the longitudinal seat direction is not provided via the arrester element.

SUMMARY

It is thus an object of the present invention to provide an improved vehicle seat, which has an arrester element which counteracts a deformation transversely to the longitudinal seat direction of a coupling element, which is provided connecting a seat frame to a floor component group.

According to a first aspect of the present invention, a vehicle seat is provided with an arrester element having a planar section which the coupling element can contact in case of a crash and along which forces are then transferred from the coupling element to the seat frame in order to counteract a deformation of the coupling element.

Here, a planar section is understood to be a section which, compared to the extension of a (curved, uneven or flat) surface defined by it, has much less thickness. The planar section is thereby arranged in such a manner that, in case of a crash, when the coupling element comes into contact with the planar section, forces occurring along the surface defined by the planar section are introduced into the seat frame by a contact location between the coupling element and the arrester element.

If the arrester element is a sheet metal part, for example, the arrester element is arranged and formed in such a manner that, in case of a crash, the load on the sheet metal essentially occurs in the plane of the sheet metal and, at the most, very much smaller forces act vertically to this plane in the sheet metal part.

The planar section of the arrester element has a first and a second region, for example, wherein the coupling element can contact the planar section in the first region in case of a crash and the planar section in the second region is supported on a component of the seat frame. Thus, the occuring forces can be transferred from the coupling element to the seat frame via the arrester element along the surface of its planar section, in order to achieve a stabilization of the coupling element transversely to the longitudinal seat direction.

In one exemplary embodiment, the planar section of the arrester element forms a first region, which projects in a platform-shape from the arrester element. This platform-shaped first region then extends at least in a position of the seat frame relative to the floor component group at least partially laterally along the coupling element, so that this platform-shaped first region resists lateral bending or torsion of the coupling element in case of a crash.

Here, the platform-shaped first region can also run inclined at an angle to the adjacent second region of the planar section, via which the seat frame is supported.

In one exemplary embodiment, the arrester element can engage behind the coupling element at the first region of the planar section. Thus, it can be ensured that the arrester element "catches" the coupling element securely in case of a crash and that the coupling element and the arrester element are in interlocking contact. For example, the first region has a protrusion projecting in the direction of the coupling element, so that the planar section in the first region forms a hook-shaped end. The arrester element can engage behind the coupling element continuously or at least in case of a crash via this hook-shaped end.

In one exemplary embodiment, a distance of the seat frame from the floor component group can be adjusted vertically to the longitudinal seat direction and the seat frame is connected to the floor component group for this purpose via the one coupling element at the least, usually via several coupling elements. In such a vehicle seat, the height of the seat frame can be adjusted accordingly. Here, the arrester element can be arranged at the seat frame in such a manner that contact by the coupling element with the arrester element is only possible from a predetermined minimum distance of the seat frame to the floor component group. In other words, the arrester element is arranged on the seat frame in such a manner that the coupling element can only come into contact with the arrester element in case of a crash if the seat frame was located at a predetermined minimum distance to the floor component group prior to the occurrence of the crash. Such an embodiment is based on the fundamental idea that, even with height-adjustable seats, the risk of an obvious bending or torsion of the coupling elements connecting the seat frame with the floor component group is greatest when the seat frame is in an upper adjustment position. Even in such an upper adjustment position, when the seat frame is at a minimum distance to the floor component group, the arrester element is intended to act in case of a crash and to counteract a deformation of the respective coupling element. In a lower adjustment position, an interaction between the coupling element and the arrester element is not provided in case of a crash. The arrester element is thus merely active in a part of a possible adjustment region of the seat frame relative to the floor component group.

In an alternative embodiment, the arrester element can, of course, be formed and arranged in such a manner that it counteracts a deformation of the (corresponding) coupling element transverse to the longitudinal seat direction regardless of the distance of the seat frame from the floor component group in case of a crash. For example, an arrester element can be provided for this, which extends in a bridge-like manner over a section of the coupling element. A planar section of the arrester element, which the coupling element contacts in a crash and along which forces are then transferred from the coupling element to the seat frame, would thereby extend in a bridge-like manner over a section of the coupling element. The arrester element thus defines a clearance between itself or its planar section and a component of the seat frame, to which the coupling element is fixed, so that the coupling element projects into this clearance or even projects through this clearance.

The arrester element can thus be fixed to a component of the seat frame via at least two mounting points spaced apart and can extend over a section of the coupling element with its planar section between these two mounting points. A higher degree of rigidity of the arrester element can also be achieved via the two mounting points spaced apart, between which a contact of the coupling element with the arrester element is provided in case of a crash, in order to counteract an undesirable deformation of the coupling element.

The arrester element is preferably formed as a sheet metal part. In one embodiment, the arrester element is formed as a type of angle plate. In another embodiment, it is formed as a longitudinally extending sheet metal part with a U- or L-shaped cross section.

In accordance with a second aspect of the invention, a vehicle seat is proposed, where the seat frame has two opposing seat side components extending transversely to the longitudinal seat direction, between which a connection element extends, and where the arrester element is connected with this connection element.

An additional bracing of the arrester element can be achieved by connecting the arrester element with the connection element of the seat frame extending between the two seat side components and preferably connecting these. It is also ensured that the arrester plate introduces forces into the connection element and thus into both seat side components in case of a crash.

The connection element can thereby connect the two seat side components of the seat frame with one another directly or indirectly via two arrester elements, which are respectively fixed to one of the seat side parts. Thus, for example, the connection element can comprise a transverse shaft, a transverse bar or a transverse tube, which is provided in any case on the seat frame to form a seat component and is now additionally utilised to fix the arrester element to it. In an alternative embodiment, the connection element is an additional component extending between the two seat side components and is provided for the connection of two (preferably symmetrical) arrester elements, which are provided on the inner sides facing each other of the two seat side components. Here, the connection element can also comprise a transverse shaft, a transverse bar or a transverse tube.

Essentially, it is seen as advantageous if the arrester element has an opening into which the connection element engages, in order to provide hereby an interlocking and possibly a frictional connection between the arrester element and the connection element. Alternately, the arrester element can be fitted to the connection element, e.g. by welding, or be molded with it.

In one exemplary embodiment, the connection element (for fixing the arrester element to it) is reshaped. A section of the connection element is thus formed in another shape in order to fix the arrester element to the connection element. It can thus be arranged that one end of the connection element is crimped in order to fix the arrester element to the connection element. In so doing, in one embodiment, the arrester element can be simultaneously fixed to a seat side part with the aid of the reshaped connection element. Accordingly, in the course of assembly, a connection section of the arrester element would be positioned here between the seat side part and the section of the connection element to be crimped, and the connection element would then be attached by crimping.

Essentially, the arrester element can, of course, also be fixed to the connection element via a welded joint and/or via additional fastening means, such as screws or a rivet. The arrester element can also be fixed to a component of the seat frame, such as a seat side component, by welding and/or by additional fastening means.

BRIEF DESCRIPTION OF THE DRAWINGS

Further advantages and features of the present invention will become clear in the following description of embodiment examples by means of the figures.

FIG. 1A-1C depict a section of a first embodiment of a vehicle seat according to the invention with an arrester element in the form of an angle plate, which, in case of a crash, counteracts a deformation of a coupling element hinged to a longitudinal seat direction with two transverse hinges.

FIG. 2A-2D depict different views of a further embodiment of the exemplary embodiment in FIG. 1A to 1C, with an arrester element whose rigidity is increased by a connection element extending between two seat side components of the seat frame.

FIG. 3A-3B depict a section and different views of a further exemplary embodiment of a vehicle seat according to the invention with an arrester element extending in a bridge-like manner over a section of the coupling element in order to counteract its deformation in case of a crash.

FIG. 4A-4B depict a section and different views of a further form of the embodiment in FIGS. 3A and 3B, with an arrester element, which has a cross section deviating from that of FIGS. 3A and 3B.

DETAILED DESCRIPTION

Figure 4B:
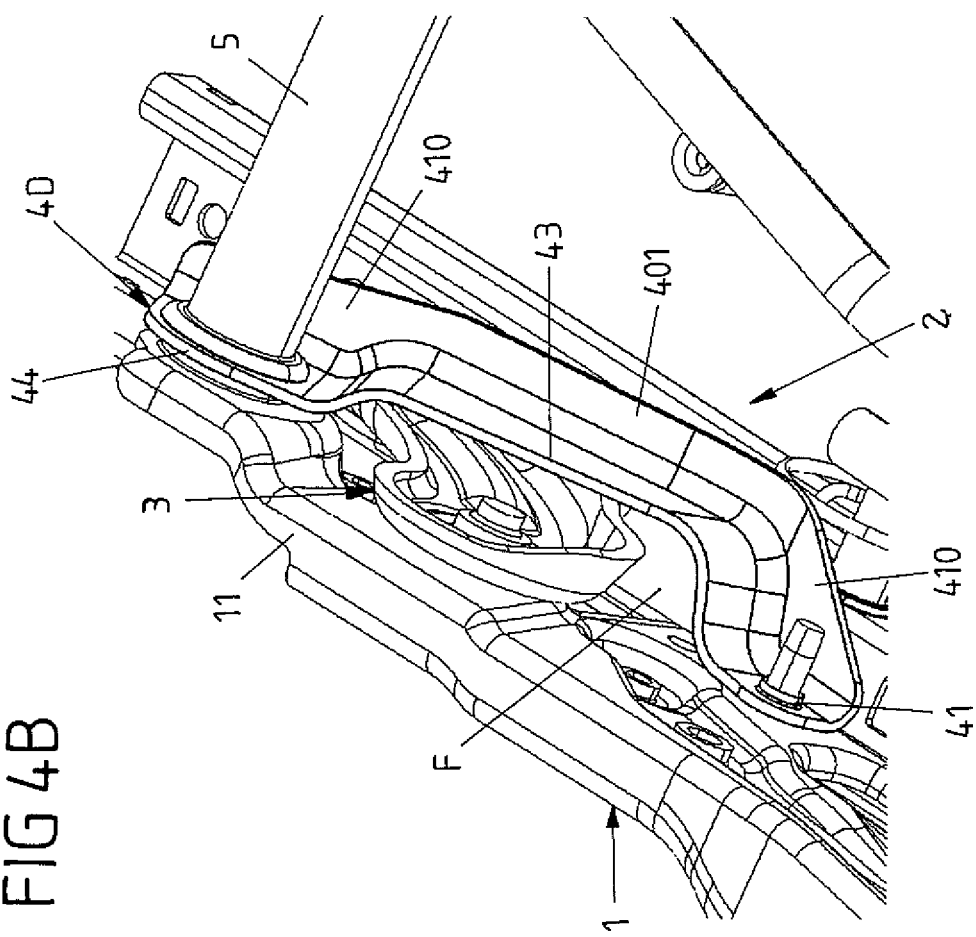

FIGS. 1A, 1B and 1C depict a section and different enlarged views of a vehicle seat with a seat frame 1, which is arranged on a floor component group via several coupling elements 3 formed as levers, of which elements only one is shown. The floor assembly in the present case comprises a rail arrangement with two parallel pairs of rails 2, 2', of which only one pair of rails 2 is shown in FIGS. 1A to 1C. The vehicle seat can be displaced along the rail arrangement 2, 2' in a longitudinal seat direction x.

The distance between the seat frame 1 and the floor assembly can also be adjusted in via the coupling elements 3; the vehicle seat is thus height-adjustable. For this, the coupling element 3, formed as a lever, is shown hinged to a seat frame component 11 of the seat frame 1 at a first (lever) end at a first mounting point 31 and is further hinged to the pair of rails 2 at a second (lever) end at a second mounting point 32, for example an upper rail of the pair of rails 2. In such a manner, a distance of the seat frame 1 from the rail arrangement 2, 2' of the floor component group can be adjusted variably via a device for the seat height adjustment, not shown here. In FIG. 1A, the seat frame 1 is shown in an upper adjustment position and, in FIG. 1C, in a lower adjustment position.

In case of a crash, there is the risk, even in an upper adjustment position, that the coupling element 3 will deform transversely to the longitudinal seat direction x in the region of a center piece 30 extending between the two mounting points 31 and 32. With transverse forces acting on the coupling element 3 along a spatial direction y, this could be twisted and/or bent laterally in an undesirable manner, whereby the seat frame 1 does not remain in a desirable position relative to the rail arrangement 2, 2' and/or undesirable transverse forces are introduced into the rail arrangement 2, 2'.

In order to avoid this, an arrester element in the form of an arrester plate 4A is fixed to the seat side part 11 of the seat frame 1, which plate comes into contact with the center piece 30 of the coupling element from a predetermined minimum distance between the seat frame 1 and the rail arrangement 2, 2' in case of a crash and counteracts a deformation of the coupling element 3 transversely to the longitudinal seat direction x. Here, the arrester plate 4A is in the form of a type of an angle sheet and has two planar sections 41 and 42 running at an angle to each other (here, approximately 90°). Here, the arrester plate 4A is fixed (for example, with the aid of two screws or rivets) as a separate component to an inner side of the seat side part 11 via a section, the fastening section 41. The arrester plate 4A is also arranged in such a manner that, when the arrester plate 4A is assembled, the fastening section extends essentially vertically to the longitudinal seat direction x and the other section at an angle to this, the arrester section 42, extends largely parallel to the longitudinal seat direction x and projects from the inner side of the seat side part 11.

The arrester section 42 forms an arrester region 420 with a hook end projecting in a platform-shape in the direction of the longitudinal seat direction x or slightly sloped. In accordance with FIGS. 1A and 1B, this platform-shaped arrester region 420 can engage behind the coupling element 3 at a rim 300 of the coupling element 3 in an upper adjustment position of the vehicle seat in case of a crash. Here, an interlocking connection between the coupling element 3 and the arrester plate 4 is formed in a crash and the arrester plate 4 also counteracts a deformation of the coupling element 3 in the longitudinal seat direction x.

In accordance with FIG. 1A, in the present case, the platform-shaped projecting arrester region 420 runs to a second region of the planar arrester section 42, inclined at an angle α, via which the arrester region 420 is connected to the fastening section 41. This second region is supported on a seat side part 11 so that, on the introduction of forces transversely to the longitudinal seat direction x into the arrester region 420, these forces are essentially introduced into the seat side part 11 along the surface defined by the arrester section 42. At most, minor forces must be absorbed vertical to this surface. Due to the formation of the arrester plate 4 shown, the arrester region 420 of the arrester section 42 thus extends laterally adjacent to the coupling element 3 from a specific seat height, so that a part of the coupling element 3 lies in the region of the center piece 30 between the seat side part 11 and the arrester region 420. In this manner, bending of the coupling element 3 transversely to the longitudinal seat direction and twisting of the coupling element 3 can be counteracted by the arrester element 4A in case of a crash.

In FIGS. 2A, 2B, 2C and 2D, a section of a further embodiment of the previously explained embodiment of FIGS. 1A to 1C is illustrated. In this further embodiment, an arrester element 4B is provided, which has an additional bracing region 421 at its arrester section 42. In this bracing region 421, the arrester plate 4B is connected to a connection element in the form of an additional tube 6, which extends between two seat side components 11 and 12 lying opposite to each other transversely to the longitudinal seat direction. The bracing region is tongue-shaped in the present case and is bent from the (second) region of the arrester section 42 connected to the fastening section 41, here by approximately 90°, so that the fastening section 41 and the bracing region run parallel to each other.

As can be seen in FIG. 2A in particular, the additional tube 6 runs parallel to two further connection elements in the form of a front and a rear connection tube 5 and 7, which respectively connect the two seat side components 11 and 12 (directly) to each other. Here, the rear connection tube 7 is part of a conventional seat height adjustment, which is not explained in detail here, via which the distance of the seat frame 1 with its two seat side components 11 and 12 can be changed relative to a floor component group of the seat with the rail arrangement 2, 2'. The two seat side components 11 and 12 are also connected to each other between the two connection tubes 5 and 7 via the additional tube 6. Thereby, in the present case, the additional tube 6 is fixed at each end to an arrester plate 4B which is arranged at the seat side part 11 or the seat side part 12 (cf. FIGS. 2A and 2D). An additional bracing compared to the embodiment of FIGS. 1A to 1C is achieved via the additional tube 6 in the region of the arrester plates 4B, so that an even larger resistance counteracts a deformation of the (front) coupling elements 3 transversely to the longitudinal seat direction x in case of a crash.

While, in the embodiments of FIGS. 1A to 1C and 2A to 2D, an arrester plate 4A and 4B can come into contact with a coupling element 3 only from a specific seat height and thus a specific distance of the seat frame 1 from the floor component group to the rail arrangement 2, 2' in order to counteract a deformation in case of a crash, in the exemplary embodiments of FIGS. 3A-3B and 4A-4B, an arrester plate 4C or 4D is respectively provided, which forms a deformation obstruction for a coupling element 3 in all possible adjustment positions of the vehicle seat.

Both arrester plates 4C and 4D are extended longitudinally for this purpose and are connected to the seat side part 11 shown at two mounting points. The respective arrester plate 4C or 4D extends between these two mounting points over a part of the coupling element 3. The arrester plate 4C or 4D thus extends in a bridge-like manner over a part of the center piece 30 of the coupling element 3.

Both the arrester plate 4C in FIGS. 3A-3B and the arrester plate 4D in FIGS. 4A-4B have a planar arrester section 43, which can contact the coupling element 3 in case of a crash and along which are then transferred forces from the coupling element 3 to the seat side part 11 in order to counteract a deformation of the coupling element 3 transversely to the longitudinal seat direction x. Here, the planar arrester section 43 also features the fastening section 41, via which the respective arrester plate 4C or 4D is fixed to the seat side part 11 at a first mounting point, and a connection section 44, via which the arrester plate 4C or 4D is fixed to the seat side part 11 at a second mounting point.

By extending the respective arrester plate 4C or 4D in a bridge-like manner between its two mounting points at the seat side part 11 across a part of the coupling element 3, it forms a clearance F between its planar arrester section 43 and the inner side of the seat side part 11. The coupling element 3 projects through this clearance F. Thereby, it is ensured in every adjustment position of the seat frame 1 relative to the floor component group with the rail arrangement 2, 2' that, with a part of its center piece, the coupling element 3 makes contact with the arrester plate 4C or 4D in case of a crash, when forces act on it, which would lead to a deformation of the coupling element 3 transversely to the longitudinal seat direction x.

Additionally, a passage opening is provided at the connection section 44 in each case, through which one end of the front connection tube 5 of the seat frame 1 is passed. The respective arrester plate 4C or 4D is also connected to the connection tube 5, which connects the two seat side components 11 and 12 of the seat frame 1 as shown, e.g., in FIGS. 2A and 2D. The two arrester plates 4C at the different seat side components 11, 12 or the two arrester plates 4D at the different seat side components 11, 12 are in each embodiment symmetrically shaped. Accordingly, in FIGS. 3A to 3B and 4A to 4B, respectively, merely one of the two arrester plates 4C or 4D at the seat side part 11 is shown in each case, wherein the features described with respect to this arrester plate 4C or 4D and shown in said figures naturally also apply to its counterpart at the other seat side part 12.

In the present case, the attachment of an arrester plate 4C or 4D to the connection tube 5 is by a crimped flange at the end of the connection tube 5. During the assembly, the connection section 44 is initially arranged next to the seat side part 11 and thereafter one end of the connection tube 5 is passed through the opening of the connection section 44. The connection tube 5 is then fixed to the seat side part 11 and the respective arrester plate 4C or 4C to the connection tube 5 by crimping.

Alternately, of course, it also would be possible to weld the connection section 44 to the connection tube 5 in the region of its opening, through which the connection tube 5 is passed.

The two arrester plates 4C and 4D in FIGS. 3A-3B and 4A-4B in the present case merely differ in their cross-sectional shape.

The arrester plate 4C in FIGS. 3A and 3B thus has a U-shaped cross section over its course between its two mounting points at the fastening section 41 and the connection section 44. The base of this U-shape thereby faces the inner side of the seat side part 11, so that the two legs are formed by a surrounding rim 400 of the arrester plate 4C, which protrudes in the direction to the opposite seat side part 12.

On the other hand, the arrester plate 4B in FIGS. 4A-4B is L-shaped in its cross section. The arrester plate 4D thus only has a rim 401 running on one (under)side of the arrester plate 4D, which protrudes in the direction of the opposite seat side component.

In each case, this rim 401 forms a bracing region 410 in the region of the fastening section 41 and the connection section 44, in which region the rim is widened. The bending stiffness of the arrester plate 4D in the region of the crossover from the region of the arrester plate 43 spaced from the seat side part 11 to the section 41 or 44 respectively fixed at the seat side part is increased over these bracing regions.

In the present case, each of the arrester plates 4A to 4B in FIG. 1A to 4B is designed as a sheet metal part and has a wall thickness of less than 5 mm, preferably of less than 4 mm. For example, a wall thickness in an arrester plate 4A or 4B according to FIGS. 1A-1C and 2A-2D can be in the region of approximately 3 mm and, in an arrester plate 4C or 4D according to FIGS. 3A-3B and 4A-4B, in the region of approximately 2 mm.

The invention claimed is:

1. A vehicle seat comprising: a floor component group;
a seat frame, which is fixed to the floor component group, wherein the seat frame is connected to the floor component group via at least one coupling element and is spaced from the floor component group essentially vertically to a longitudinal seat direction, wherein the at least one coupling element is fixed to the seat frame and to the floor component group, and
an arrester element on the seat frame, which arrester element is formed and arranged in such a manner that the at least one coupling element can make contact with the arrester element in case of a crash, and the arrester element then counteracts a deformation of the at least one coupling element transversely to the longitudinal seat direction, wherein the arrester element has a planar section that the at least one coupling element can contact in case of a crash and along which forces from the at least one coupling element are then transferred to the seat frame, in order to counteract a deformation of the at least one coupling element transversely to the longitudinal seat direction, wherein a distance of the seat frame from the floor component group can be adjusted essentially vertically to the longitudinal seat direction and wherein the seat frame is connected to the floor component group for this adjustment via the at least one coupling element, and wherein the arrester element is arranged on the seat frame in such a manner that contact of the at least one coupling element with the arrester element is only possible from a predetermined minimum distance between the seat frame and the floor component group.

2. The vehicle seat in accordance with claim 1, wherein the arrester element is formed as a sheet metal part.

3. The vehicle seat in accordance with claim 1, wherein the planar section extends in a bridge manner over a section of the at least one coupling element.

4. The vehicle seat in accordance with claim 3, wherein the arrester element is fixed to a component of the seat frame via at least two mounting points spaced apart from each other, and wherein the arrester element with its planar section extends between these mounting points over the section of the at least one coupling element.

5. The vehicle seat in accordance with claim 1, wherein the planar section has a first and a second region, wherein the at least one coupling element can contact the planar section in case of a crash in the first region, and wherein the planar section is supported in the second region by a component of the seat frame.

6. The vehicle seat in accordance with claim 5, wherein the first region of the planar section projects from the arrester element in a platform-shape.

7. The vehicle seat in accordance with claim 6, wherein the platform-shaped first region of the planar section runs inclined at an angle to the second region of the planar section.

8. The vehicle seat in accordance with claim 5, wherein the arrester element can engage behind the coupling element in the first region.

9. The vehicle seat in accordance with claim 8, wherein the planar section forms a hook-shaped end in the first region.

* * * * *